United States Patent
Fukuda

(10) Patent No.: US 7,600,889 B2
(45) Date of Patent: Oct. 13, 2009

(54) LAMP HOLDER AND LAMP HOLDER ATTACHMENT STRUCTURE

(75) Inventor: Yutaka Fukuda, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 113 days.

(21) Appl. No.: 11/847,499

(22) Filed: Aug. 30, 2007

(65) Prior Publication Data

US 2008/0055917 A1 Mar. 6, 2008

(30) Foreign Application Priority Data

Sep. 5, 2006 (JP) .............................. 2006-240411

(51) Int. Cl.
*F21S 4/00* (2006.01)
*F21V 7/04* (2006.01)
*G09F 13/04* (2006.01)

(52) U.S. Cl. ...................... 362/225; 362/634; 362/97.1

(58) Field of Classification Search ................. 362/613, 362/614, 632, 633, 634, 97, 29, 30, 217.14, 362/217.16, 225, 382
See application file for complete search history.

(56) References Cited

U.S. PATENT DOCUMENTS

| | | | | |
|---|---|---|---|---|
| 3,233,502 | A * | 2/1966 | Fernberg | 411/500 |
| 7,070,313 | B2 * | 7/2006 | Kim et al. | 362/561 |
| 2005/0162582 | A1 | 7/2005 | Kitada et al. | |
| 2005/0225992 | A1 | 10/2005 | Idei et al. | |
| 2005/0281037 | A1 | 12/2005 | Murakami et al. | |
| 2006/0039163 | A1 * | 2/2006 | Yun | 362/600 |
| 2006/0158905 | A1 * | 7/2006 | Lai et al. | 362/634 |
| 2007/0053171 | A1 | 3/2007 | Park | |
| 2007/0058397 | A1 | 3/2007 | Aoki et al. | |
| 2007/0070652 | A1 | 3/2007 | Takata et al. | |

FOREIGN PATENT DOCUMENTS

| | | | |
|---|---|---|---|
| JP | 05-067021 U | * | 9/1993 |
| JP | 2003-346541 A | | 12/2003 |
| JP | 2004-348150 A | | 12/2004 |
| JP | 2005-208317 A | | 8/2005 |
| JP | 2006-003732 A | | 1/2006 |
| WO | WO 2006/059413 A1 | | 6/2006 |
| WO | WO 2006/059465 A1 | | 6/2006 |

OTHER PUBLICATIONS

European Search Report dated Jan. 8, 2008 (Seven (7) pages).

* cited by examiner

*Primary Examiner*—Ismael Negron
*Assistant Examiner*—David R Crowe
(74) *Attorney, Agent, or Firm*—Crowell & Moring LLP

(57) ABSTRACT

A lamp holder including a supporting base; holding units to hold a light source, which are provided on one surface of the supporting base; and locking units to lock the supporting base in a predetermined position, which are provided on the other surface of the supporting base; and the holding units are provided at at least both ends of the supporting base, and the locking units extend outside the supporting base along a longitudinal direction of the supporting base at the both ends of the supporting base, the locking units comprising a first locking unit which is engageably inserted in a predetermined opening and an elastically deformable second locking unit which is a projecting unit shaped in an approximately oval shape projecting in a thickness direction of the supporting base and which is inserted in a predetermined through hole.

6 Claims, 6 Drawing Sheets

LAMP HOLDER AND LAMP HOLDER ATTACHMENT STRUCTURE

BACKGROUND OF THE INVENTION

1. Field of the Invention

The present invention relates to a lamp holder and a lamp holder attachment structure.

2. Description of the Related Art

Conventionally, there is known a technique in which a light source such as fluorescent tubes used for a back light of a liquid crystal display apparatus is held by a supporting member such as a lamp holder, and the fluorescent tubes (light source) are to be attached at a predetermined position via the supporting member (for example, see JP2006-3732A, JP2005-208317A, JP2004-348150A, and JP2003-346541A).

Holding units for holding the fluorescent tubes are provided on one of the surfaces of the supporting member, and a locking unit such as a fixation pin or the like is provided on the other surface of the supporting member. The supporting member is fixed to the liquid crystal display apparatus by inserting the locking unit in an opening such as a through hole or the like formed on a frame or a mounting plate of the liquid crystal display apparatus. Therefore, the fluorescent tubes which are held by the holding units of the supporting member can be attached to the predetermined position of the liquid crystal display apparatus.

However, in the case of the above described conventional technique, when each holding unit 102 and each engaging unit 103 are respectively provided so as to be arranged in the front and back of the supporting member 101 as shown in FIG. 6A, a portion of the each locking unit 103 which corresponds to the each holding unit 102 must be pressed when the engaging units 103 are being inserted in the predetermined through holes. Therefore, it is difficult to insert the locking units 103 in the through holes, and also, there is a problem that the holding units 102 which are pushed may break.

Therefore, in some cases, the holding units 102 and the locking units 103 of the supporting member 101 are arranged by being shifted so that the alignments of the holding units 102 and the locking units 103 do not correspond in the front side and the back side of the supporting member 101. However, in a case where the holding units 102 must be provided at the ends in a longitudinal direction of the supporting member 101 as shown in FIG. 6B, stability of the ends of the supporting member 101 is bad and there is a problem that the fluorescent tubes (light source) 20 cannot be preferably supported when the locking units 103 are provided at the positions shifted toward inside in the longitudinal direction of the supporting member 101.

Moreover, in a case where the holding units 102 must be provided at the ends in the longitudinal direction of the supporting member 101 as shown in FIG. 6C, there is a problem that the manufacturing cost increases because the supporting member 101 need to be longer (larger) for the locking units 103 in order to provide the locking units 103 at the positions shifted toward outside in the longitudinal direction of the supporting member 101.

SUMMARY OF THE INVENTION

It is, therefore, a main object of the present invention to provide a lamp holder and a lamp holder attachment structure in which a light source can be attached at a predetermined position in a good condition.

According to a first aspect of the present invention, there is provided a lamp holder comprising a supporting base, holding units to hold a light source, which are provided on one surface of the supporting base, and locking units to lock the supporting base in a predetermined position, which are provided on the other surface of the supporting base, and the holding units are provided at least both ends of the supporting base, and the locking units extend outside the supporting base along a longitudinal direction of the supporting base at the both ends of the supporting base, the locking units comprising a first locking unit which is engageably inserted in a predetermined opening and an elastically deformable second locking unit which is a projecting unit shaped in an approximately oval shape projecting in a thickness direction of the supporting base and which is inserted in a predetermined through hole.

According to a second aspect of the present invention, there is provided a lamp holder comprising a supporting base, holding units to hold a light source, which are provided on one surface of the supporting base, and locking units to lock the supporting base in a predetermined position, which are provided on the other surface of the supporting base, and the holding units are provided at least both ends of the supporting base, and the locking units extend outside the supporting base along a longitudinal direction of the supporting base at the both ends of the supporting base, the locking units comprising a first locking unit which is engageably inserted in a predetermined opening and a second locking unit which projects in a thickness direction of the supporting base and which is inserted in a predetermined through hole.

According to a third aspect of the present invention, there is provided a lamp holder attachment structure for attaching the lamp holder claimed in claim 1 to a predetermined position, and a protrusion having a length corresponding to the second locking unit which is inserted in the through hole and projects from an opposite side of the supporting base is provided in proximity of the second locking unit.

BRIEF DESCRIPTION OF THE DRAWING

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE INVENTION

Figure 1:
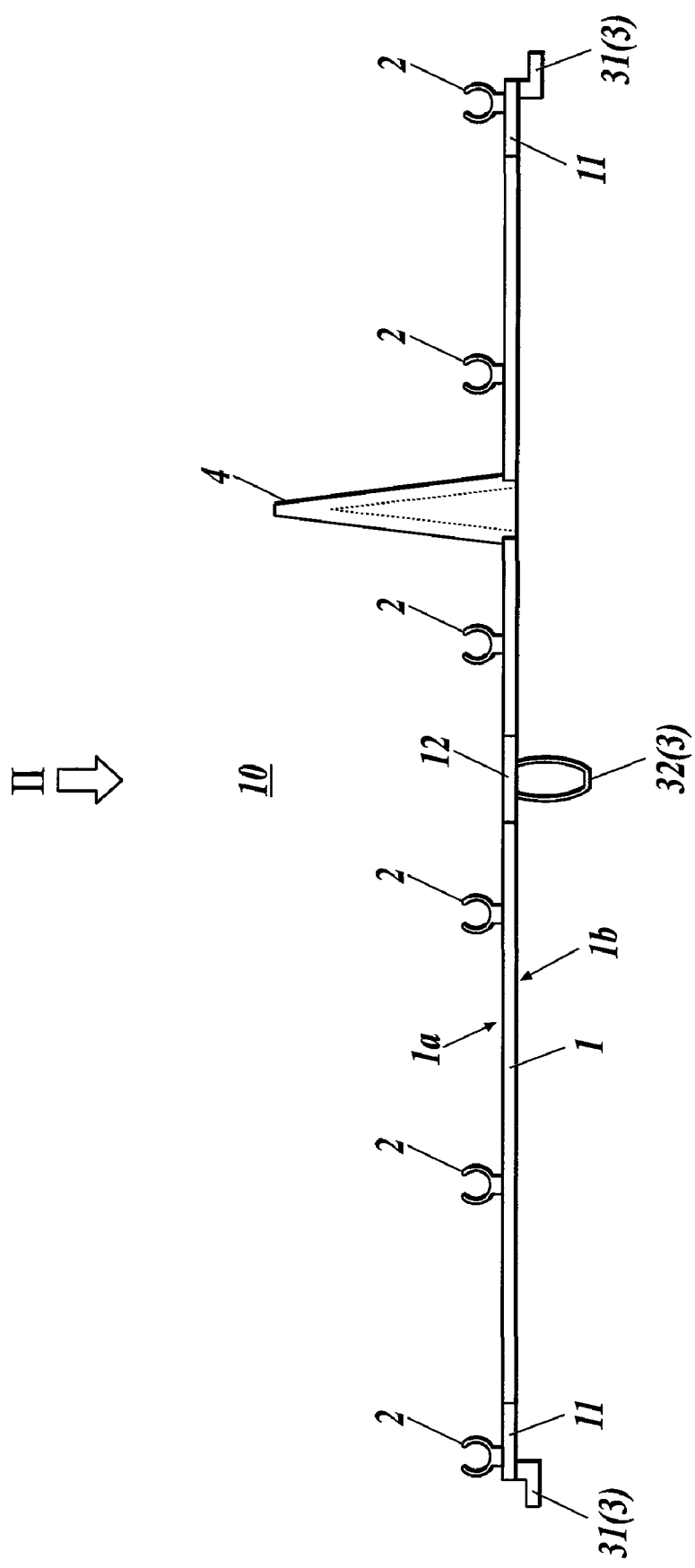
FIG. 1 is a side view showing a lamp holder according to the present invention.

Hereinafter, a specific embodiment of a lamp holder and a lamp holder attachment structure according to the present invention will be described with reference to the drawings. However, the scope of the invention is not limited to the examples shown in the drawings.

The lamp holder is a member for holding fluorescent tubes which are used as a back light of a liquid crystal display apparatus, and for attaching the fluorescent tubes to a predetermined position.

Figure 2:
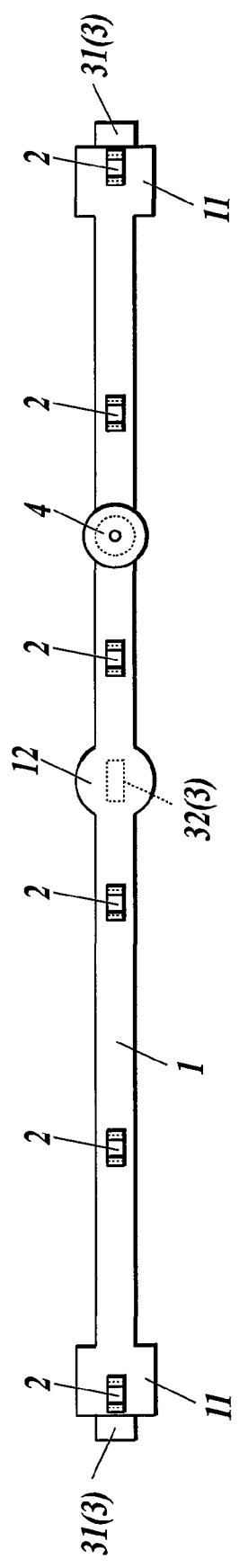
FIG. 2 is a top view showing the lamp holder according to the present invention which is in a plan view seen from an arrow II side of FIG. 1.

As shown in FIGS. 1 and 2, a lamp holder 10 comprises an elongated plate-shaped supporting base 1, holding units 2 provided on an upper surface 1a which is one of the surfaces of the supporting base 1, locking units 3 including first locking units 31 and second locking unit 32 which are provided on a lower surface 1b which is the other surface of the supporting base 1, and a spacer 4 provided on the upper surface 1a of the supporting base 1.

The lamp holder 10 is formed with resin such as polypropylene, polyethylene, or the like, and each part is integrally formed by resin being integrally molded.

The supporting base 1 includes end parts 11 and a center part 12 which are slightly wider among the entire supporting base 1. The first locking units 31 are provided on the lower surface 1b of the end parts 11 which are both ends of the supporting base 1, and the second locking unit 32 is provided on the lower surface 1b of the center part 12.

Moreover, a plurality (six in the embodiment) of holding units 2 are provided on the upper surface 1a of the supporting base 1. The holding units 2 are particularly provided at the end parts 11 which are the both ends of the supporting base 1.

Here, because the supporting base 1 is formed with relatively soft resin, the supporting base 1 has flexibility to deform in a thickness direction thereof.

Each holding unit 2 has a space shaped in an approximately C-shape which is capable of grasping the fluorescent tube 20 which is the light source, and the each holding unit 2 holds the fluorescent tube 20 inserted in the space.

Particularly, the holding units 2 of the lamp holder 10 according to the present invention are provided at the end parts 11 which are the both ends of the supporting base 1. Further, the fluorescent tubes 20 can be evenly arranged on the upper surface 1a of the supporting base 1 because the plurality of holding units 2 are disposed in equal interval from the both ends of the supporting unit 1.

The locking units 3 include the first locking units 31 which extend toward outside along the longitudinal direction of the supporting base 1 at both ends (each end part 11) of the supporting base 1, and the second locking unit 32 which projects in the thickness direction of the supporting base 1 at an approximately center of the supporting base 1 in the longitudinal direction.

The first locking units 31 which are the locking units 3 are engageably inserted in predetermined openings (for example, openings 51 of the after-mentioned frame plate 50), and the second locking unit 32 which is the locking unit 3 is inserted in a predetermined through hole (for example, a through hole 52 of the after-mentioned frame plate 50). Thereby, the supporting base 1 is locked in a predetermined position of the liquid crystal display apparatus, and the lamp holder 10 is to be fixed at the predetermined position.

The first locking units 31 are projecting units shaped in an approximately L-shape in side view which are formed on the lower surface 1b at both ends of the supporting base 1, and the tip portions of the first locking units 31 extend toward outside in the longitudinal direction.

The second locking unit 32 is a ring-shaped projecting unit shaped in an approximately oval shape in side view which is formed on the lower surface 1b at the center of the supporting base 1. Particularly, the second locking unit 32 is formed with relatively soft resin. Therefore, the second locking unit 32 has flexibility so that the approximate oval shaped ring deforms, and the second locking unit 32 is elastically deformable.

Here, the holding unit 2 is not to be formed on the upper surface 1a of the supporting base 1 (center part 12) corresponding to the lower surface 1b of the supporting base 1 (center part 12) where the second locking unit 32 is provided.

The spacer 4 is a projecting unit shaped in an approximately cone shape, and is formed so as to be taller than the holding units 2.

The spacer 4 is provided for preventing a diffuser plate or the like which is disposed in the upper surface 1a side of the supporting base 1 of the lamp holder 10 from coming close to the frame plate 50 when the after-mentioned frame plate 50 to which the lamp holder 10 is fixed is installed in the liquid crystal display apparatus. The spacer 4 has a function of holding the diffuser plate or the like so that the fluorescent tubes 20 do not break due to the diffuser plate or the like contacting with the fluorescent tubes 20 which are held by the holding units 2 of the lamp holder 10.

The frame plate 50 is a member which is to be disposed in the liquid crystal display apparatus, and for example, is a member formed by a thin metallic plate.

Figure 3:
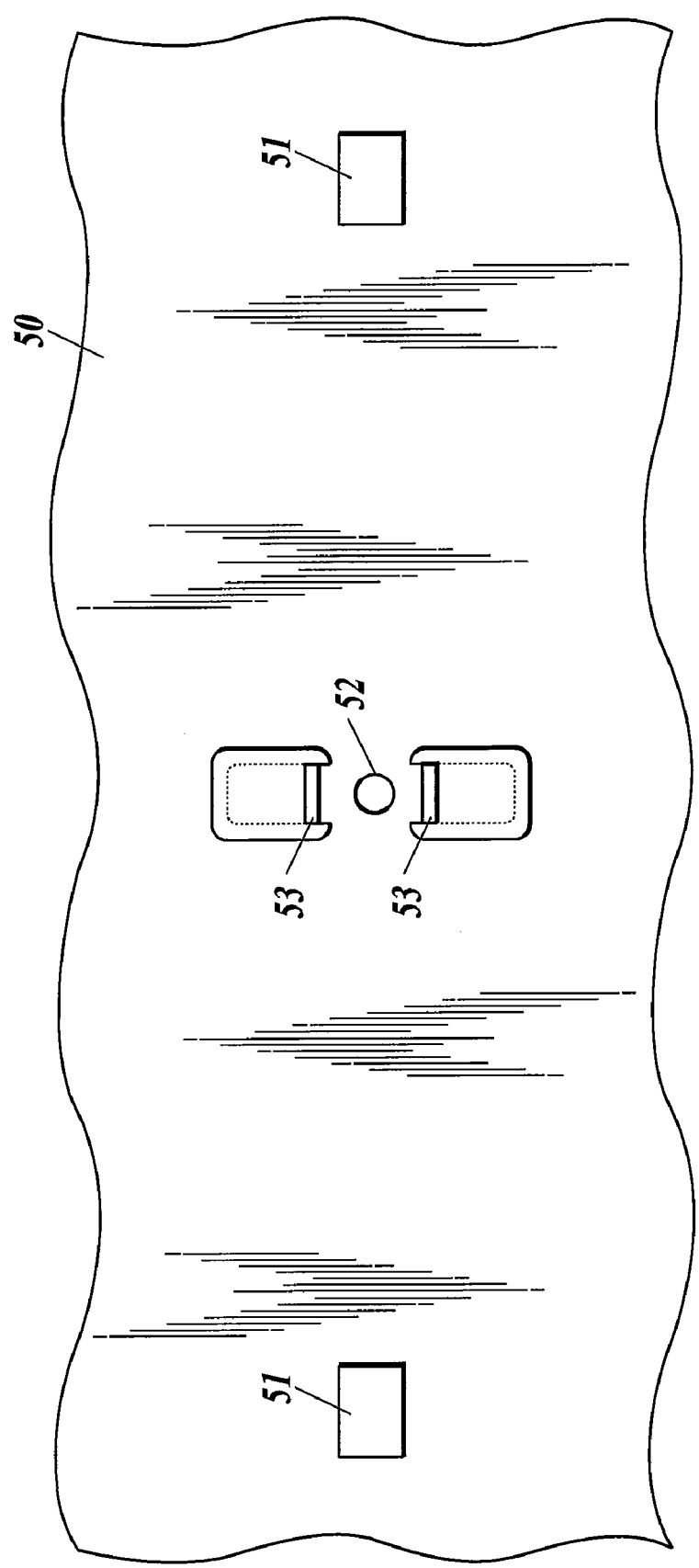
FIG. 3 is a plan view showing a frame plate to which the lamp holder is to be attached.

As shown in FIG. 3, the frame plate 50 comprises two openings 51 for one lamp holder 10 to be attached, one through hole 52 which positions between the two openings 51, and two protrusions 53 which position at both sides of the through hole 52.

The positions where the openings 51, the through hole 52, and the protrusions 53 are formed on the frame plate 50 is the predetermined position for attaching the lamp holder 10.

The openings 51 are shaped in a rectangular shape, and are holes in which the first locking units 31 are to be inserted.

The through hole 52 is shaped in a circular shape, and is a hole in which the second locking unit 32 is to be inserted.

The protrusions 53 are projecting pieces formed so that inner segments made by cutting portions of the frame plate 50 in an approximately U-shape are vertically bent in the back side of the frame plate 50. The protrusions 53 have lengths which are approximately equal to the length of the second locking unit 32, and particularly, approximately equal to the length of the second locking unit 32 which is inserted in the through hole 52 and projects from the back surface.

Next, the process of attaching the lamp holder 10 to the frame plate 50 of the liquid crystal display apparatus will be described.

First, insert the first locking units 31 which are provided at both sides of the supporting base 1 in the openings 51 from the front surface side of the frame plate 50 while the supporting base 1 of the lamp holder 10 is being deflected.

Then, both ends (end parts 11) of the supporting base 1 expand in a direction separating from one another along the longitudinal direction of the supporting base 1 by restoring the shape of the supporting base 1, and the first locking unit 31 is engageably inserted in the openings 51.

Here, the second locking unit 32 of the supporting base 1 is in a state where the tip of the second locking unit 32 is applied to the through hole 52 of the frame plate 50.

Next, the upper surface 1a of the center part 12 of the supporting base 1 is pressed, and the second locking unit 32 which is in a state of being applied to the through hole 52 portion of the frame plate 50 is inserted in the through hole 52 from the front surface side of the frame plate 50 by pressing the center part 12 to the frame plate 50.

The second locking unit 32 passes through the through hole 52 while being deformed so that the approximately oval shape is squeezed and elongated, and the second locking unit 32 is projected in the back surface side which is the opposite side of the frame plate 50. Due to the approximate oval shape of the second locking unit 32 which is projected in the back surface side of the frame plate 50 being restored, the second locking unit 32 becomes larger than the diameter of the through hole 52, and the second locking unit 32 becomes in a state of being inserted in the through hole 52.

In such way, the first locking units 31 at both ends of the lamp holder 10 are engageably inserted in the openings 51, and the second locking unit 32 at the center of the lamp holder 10 is inserted in the through hole 52. Thereby, the lamp holder 10 is attached on the front surface of the frame plate 50 as shown in FIG. 4.

Figure 4:
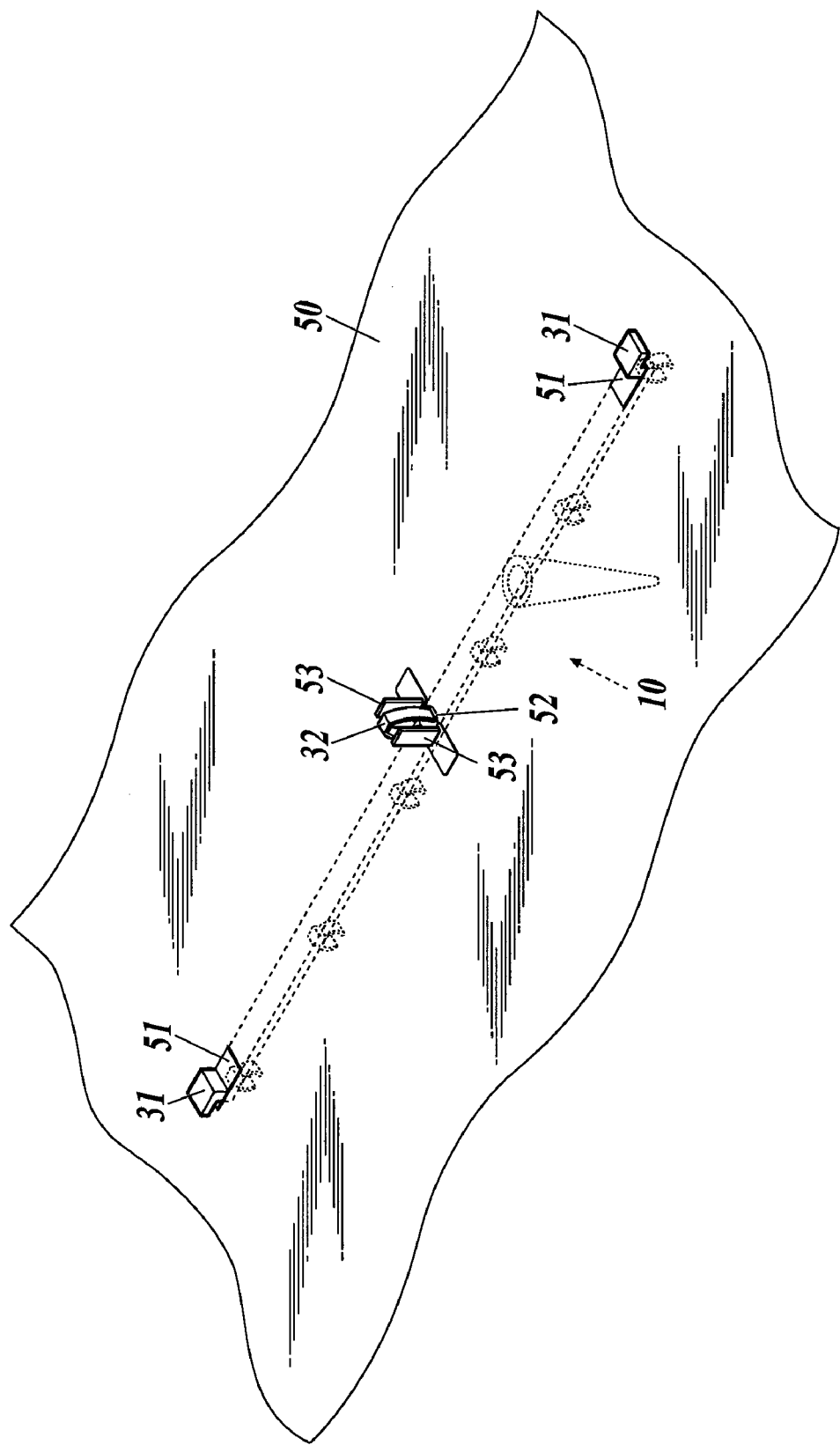
FIG. 4 is a perspective view showing a back surface of the frame plate to which the lamp holder is fixed.

Further, as shown in FIG. 4, the protrusions 53 are provided in proximity to the second locking unit 32 which is projected in the back surface side of the frame plate 50 so as to cover the periphery of the second locking unit 32. The protrusions 53 have lengths which correspond to the projected length of the second locking unit 32 and approximately equal to the length of the second locking unit 32.

Concerning the lamp holder attachment structure as shown in FIG. 4 by which the lamp holder 10 is attached to the predetermined position of the frame plate 50, even when there is a case where a force for pushing the second locking unit 32 to the front surface side from the back surface side of the frame plate 50 is applied in proximity to the second locking unit 32 which is projected to the back surfaces side of the frame plate 50, the force is difficult to be applied only to the second locking unit 32 because the force is also easily applied to the protrusions 53 when the force is applied to the second locking unit 32 by providing the protrusions 53 having lengths approximately equal to the length of the second locking unit 32 near the second locking unit 32.

Particularly, after the lamp holder 10 is attached to the predetermined place of the frame plate 50, even when there are cases where hands of the worker push the second locking unit 32 or where the working table acts so as to push the second locking unit 32 when the frame plate 50 to which the lamp holder 10 is attached is placed on the working table, the second locking unit 32 will not be pushed out from the through hole 52 due to only the second locking unit 32 being pushed because the hand of the workers, the working table, or the like contacts the protrusions 53 along with the second locking unit 32.

That is, because the protrusions 53 function as latches for the second locking unit 32, the lamp holder 10 becomes difficult to come off from the through hole 52 after the lamp holder 10 is attached to the predetermined position of the frame plate 50. Therefore the lamp holder 10 can be more surely fixed to the frame plate 50.

Moreover, when the lamp holder 10 is attached to the predetermined position of the frame plate 50, the lamp holder 10 is fixed to the frame plate 50 so that the both ends (end parts 11) of the supporting base 1 stretch in a direction separating from one another by the first locking units 31 being engageably inserted in the openings 51. Thereby, the lamp holder 10 is fixed to the frame plate 50 without easily rattling.

Figure 5:
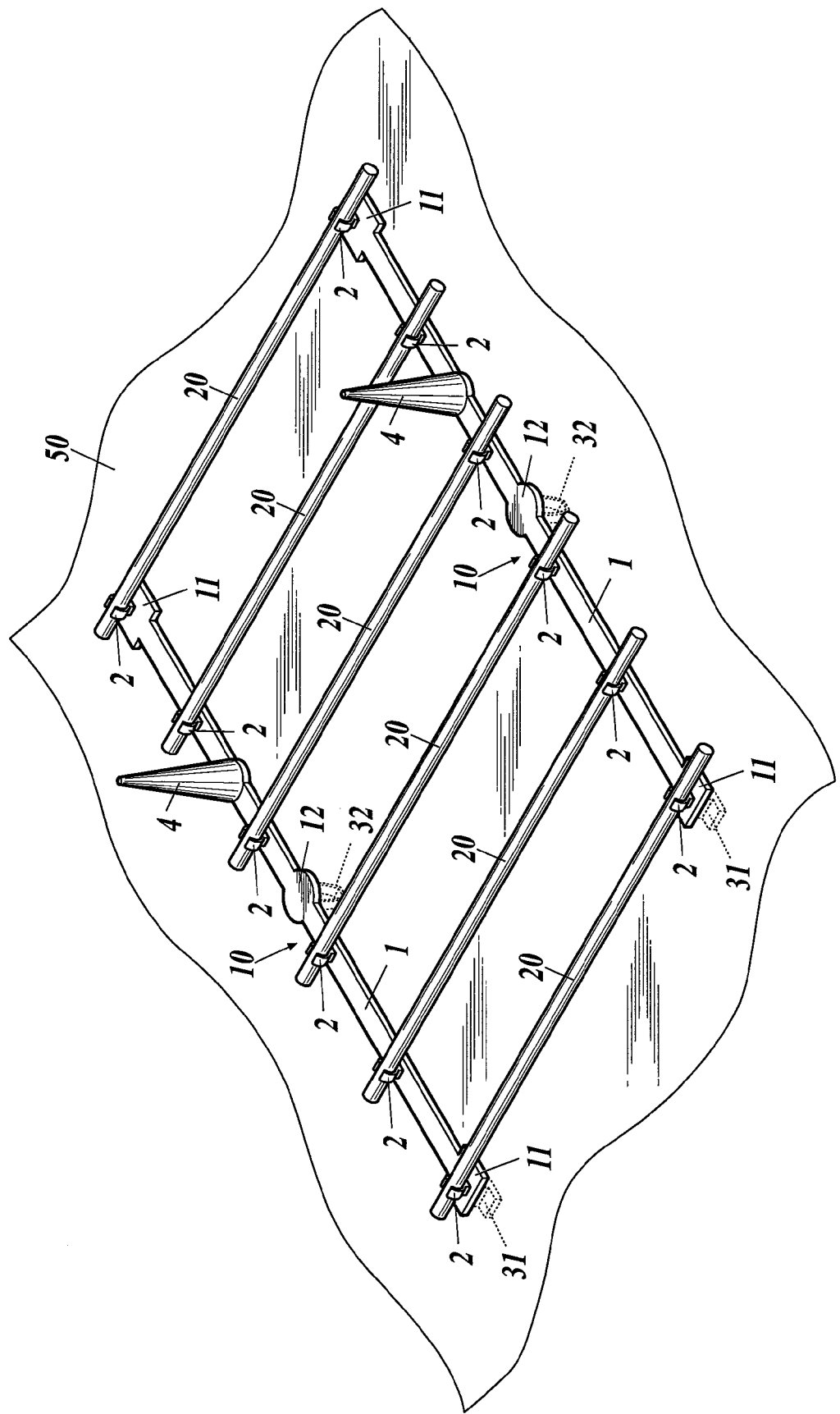
FIG. 5 is a perspective view showing a front surface of the frame plate to which the lamp holder is fixed which is in a state where fluorescent tubes are attached to holding units.
Figure 6A:
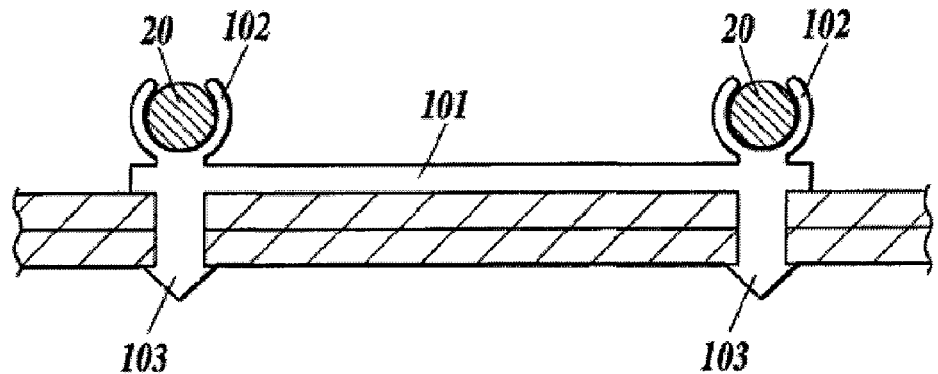
FIG. 6A is a diagram for explaining the conventional supporting member in which placements of the holding units and locking units are arranged so that each holding unit corresponds to each locking unit between front side and back side.
Figure 6B:
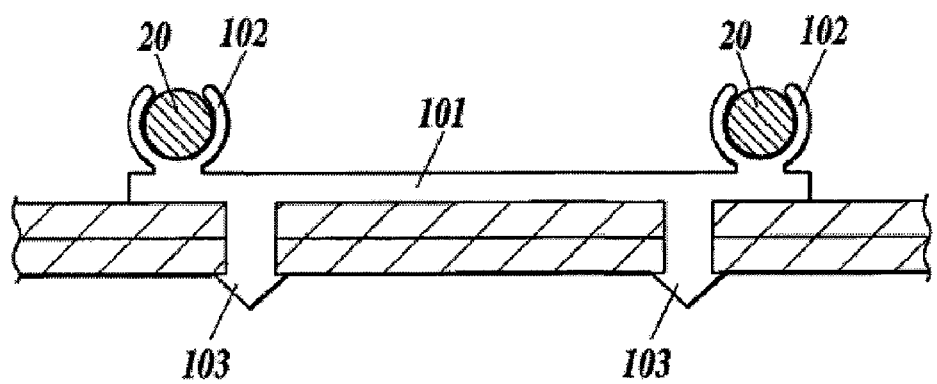
FIG. 6B is a diagram for explaining the conventional supporting member in which the locking units are shifted toward inside in a longitudinal direction of the supporting member.
Figure 6C:
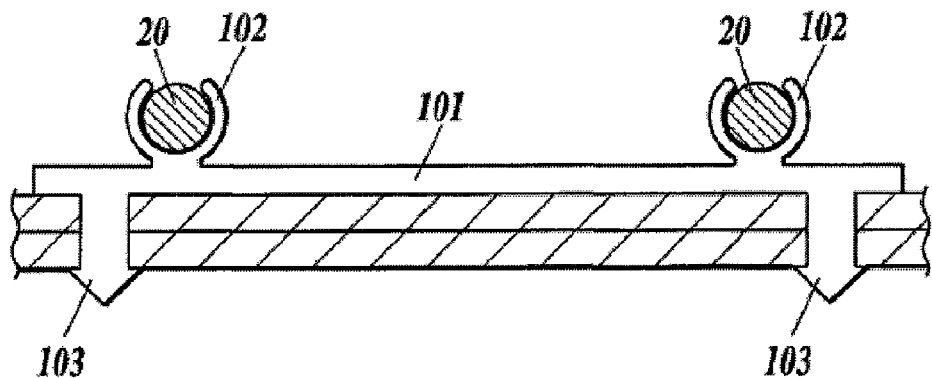
FIG. 6C is a diagram for explaining the conventional supporting member in which the locking units are shifted toward outside in the longitudinal direction of the supporting member.

According to the above described attachment structure of the lamp holder, as shown in FIG. 5, a plurality (six in the embodiment) of the fluorescent tubes 20 can be attached to the predetermined positions by attaching two lamp holders 10 to the predetermined positions of the frame plate 50 and by bridging the fluorescent tubes 20 between the holding units 2 of each lamp holder 10 which are arranged in parallel.

The frame plate 50 to which the fluorescent tubes 20 are attached via the lamp holder 10 is installed in the liquid crystal display apparatus, and is used as the back light of the liquid crystal display apparatus.

As described above, the lamp holder 10 according to the present invention can be attached by the lamp holder attachment structure in which the lamp holders 10 be rigidly and stably fixed to the frame plate 50 by the first locking units 31 provided at the end parts 11 which are the both ends of the supporting base 1 of the lamp holder 10 and the second locking unit 32 provided at the center part 12 of the supporting base 1.

Particularly, the fluorescent tubes 20 can be successfully attached at the predetermined positions in stable condition even at the end parts 11 of the supporting base 1 because the holding units 2 for holding the fluorescent tubes 20 are provided on the upper surface 1a of the end parts 11, wherein the each end part 11 is provided with the first locking unit 31 which is engageably inserted in the opening 51 of the frame plate 50, respectively.

Moreover, the second locking unit 32 can be preferably inserted in the through hole 52 by pressing the upper surface 1a of the center part 12 because the holding unit 2 is not provided on the upper surface 1a at the center part 12 to which the second locking unit 32 being inserted in the through hole 52 of the frame plate 50 is provided.

When the first locking units 31 are engageably inserted in the openings 51 or when the second locking unit 32 is inserted in the through hole 52, the holding units 2 are not touched strongly. Therefore, the holding units 2 are not broken while the lamp holder 10 is being attached, and the lamp holder 10 can be preferably attached to the frame plate 50.

Further, in the above described lamp holder attachment structure, the protrusions 53 of the frame plate 50 function as latches for the second locking unit 32. Therefore, the lamp holder 10 can be more surely fixed to the frame plate 50 because the lamp holder 10 does not come off easily after the lamp holder 10 is attached to the predetermined position of the frame plate 50.

In such way, by applying the lamp holder attachment structure which fixes the lamp holders 10 at the predetermined positions of the frame plate 50 disposed inside the liquid crystal display apparatus in a stable condition, the lamp holders 10 can successfully attach the fluorescent tubes 20 which are held by the holding units 2.

Accordingly, the above described lamp holders 10 and the lamp holder attachment structure have a function of successfully attaching the fluorescent tubes 20 at the predetermined positions.

In the above embodiment, the description is given by having the lamp holder 10 in which the second locking unit 32 is provided at one position of the center part 12 of the supporting base 1 as an example. However, the present invention is not limited to this, and the second locking unit 32 may be provided at an arbitrary position as long as the second locking unit 32 is provided on the lower surface 1b of the supporting base 1 corresponding to the position where the holding unit 2 is not provided on the upper surface 1a of the supporting base 1. In such case, the through hole 52 corresponding to the second engaging unit 32 is to be formed on the frame plate 50.

Moreover, in the above described embodiment, the description is given by having the case where the lamp holder 10 is attached and fixed to the frame plate 5 of the liquid crystal display apparatus as an example. However, the present invention is not limited to this, and the lamp holder 10 may be attached to other member which is installed in the liquid crystal display apparatus.

Moreover, it is needless to say that other specific detail structure and the like can be arbitrary modified.

According to a first aspect of the preferred embodiments of the present invention, there is provided a lamp holder comprising a supporting base, holding units to hold a light source, which are provided on one surface of the supporting base, and locking units to lock the supporting base in a predetermined position, which are provided on the other surface of the supporting base, and the holding units are provided at least both ends of the supporting base, and the locking units extend outside the supporting base along a longitudinal direction of the supporting base at the both ends of the supporting base, the locking units comprising a first locking unit which is engageably inserted in a predetermined opening and an elastically deformable second locking unit which is a projecting unit shaped in an approximately oval shape projecting in a thickness direction of the supporting base and which is inserted in a predetermined through hole.

In accordance with the first aspect of the preferred embodiments of the present invention, the lamp holder engageably inserts the first locking units which are provided at both ends of the supporting base of the lamp holder in the predetermined openings, and inserts the second locking unit in the predetermined through hole. Thereby, the lamp holder can be locked in the predetermined position, and the light source which is held by the lamp holder can be attached to the predetermined position.

When the first locking units are engageably inserted in the openings toward outside of the longitudinal direction of the supporting base, the first locking units can be engageably inserted in the openings without touching the holding units which are provided at both ends of the supporting base. Therefore, breakings of the holding units by pushing the holding units hard when attaching the lamp holder can be reduced. The second locking unit can be inserted in the through hole without touching the holing units by not providing the holding units on the opposite surface of the supporting base to which the second locking unit is provided. Therefore, similarly, breakings of the holding units can be reduced in the same manner.

Because the holding units for holding the light source are provided at both ends of the supporting base, the light source can be arranged in the predetermined position by effectively utilizing and making use of the length range of the supporting base.

Particularly, because the holding units for holding the light source are provided at both ends of the supporting base to which the first locking units are engageably inserted in the predetermined openings are provided, the supporting base being provided with the first locking units which are engageably inserted in the predetermined openings, the light source can be successfully attached to the predetermined position in a stable condition even at the ends of the supporting base.

Moreover, the second locking unit of the lamp holder is an elastically deformable projecting unit shaped in an approximately oval shape. Therefore, when the second locking unit is inserted in the predetermined through hole, the approximately oval shape of the second locking unit passes through the through hole while being deformed so as to be narrowly squeezed. When the second locking unit is projected in the opposite side of the through hole, the original shape is restored and the second locking unit returns in the approximately oval shape, and the second locking unit becomes larger than the diameter of the through hole so that the second locking unit does not escape from the through hole easily.

Such a lamp holder having the second locking unit is easy to attach to the predetermined position, and is hard to come off. Therefore, the light source which is held by the lamp holder can be successfully attached to the predetermined position.

From the above, it can be said that the lamp holder has a function of attaching the light source at the predetermined position in a good condition.

According to a second aspect of the preferred embodiments of the present invention, there is provided a lamp holder comprising a supporting base, holding units to hold a light source, which are provided on one surface of the supporting base, and locking units to lock the supporting base in a predetermined position, which are provided on the other surface of the supporting base, and the holding units are provided at least both ends of the supporting base, and the locking units extend outside the supporting base along a longitudinal direction of the supporting base at the both ends of the supporting base, the locking units comprising a first locking unit which is engageably inserted in a predetermined opening and a second locking unit which projects in a thickness direction of the supporting base and which is inserted in a predetermined through hole.

In accordance with the second aspect of the preferred embodiments of the present invention, the first locking units which are provided at both ends of the supporting base of the lamp holder are engageably inserted in the predetermined openings, and the second locking unit is inserted in the predetermined through hole. Thereby, the lamp holder can be locked in the predetermined position, and the light source held by the lamp holder can be attached at the predetermined position.

When the first locking units are engageably inserted in the openings toward outside in the longitudinal direction of the supporting base, the first locking units can be engageably inserted in the openings without touching the holding units which are provided at both ends of the supporting base. Therefore, breakings of the holding units by pressing the holding units hard while attaching the lamp holder can be reduced. The second locking unit can be inserted in the through hole without touching the holding units by not providing the holding units on the opposite surface of the supporting base to which the second locking unit is provided. Therefore, similarly, breakings of the holding units can be reduced.

Because the holding units for holding the light source are provided at both ends of the supporting base, the light source can be arranged in the predetermined position by effectively utilizing and making use of the length range of the supporting base.

Particularly, because the holding units for holding the light source are provided at both ends of the supporting base to which the first locking units are engageably inserted in the predetermined openings are provided, the light source can be successfully attached to the predetermined position in a stable condition even at the ends of the supporting base.

From the above, it can be said that the lamp holder has a function of attaching the light source at the predetermined position in a good condition.

Preferably, the second locking unit is an elastically deformable projecting unit shaped in an approximately oval shape.

In the preferred embodiments of the present invention, the same effect is obtained. Further, the second locking unit of the lamp holder is an elastically deformable projecting unit shaped in an approximately oval shape. Therefore, when the second locking unit is inserted in the predetermined through hole, the approximately oval shape of the second locking unit passes through the through hole while being deformed so as to be narrowly squeezed. When the second locking unit is projected in the opposite side of the through hole, the original shape is restored and the second locking unit returns in the approximately oval shape, and the second locking unit becomes larger than the diameter of the through hole so that the second locking unit does not escape from the through hole easily.

Such lamp holder having the second locking unit is easy to attach to the predetermined position, and is hard to come off. Therefore, the light source which is held by the lamp holder can be successfully attached to the predetermined position.

According to a third aspect of the preferred embodiments of the present invention, there is provided a lamp holder attachment structure for attaching the lamp holder claimed in claim 1 to a predetermined position, and a protrusion having a length corresponding to the second locking unit which is inserted in the through hole and projects from an opposite side of the supporting base is provided in proximity of the second locking unit.

In accordance with the preferred embodiments of the third aspect of the present invention, concerning the lamp holder attachment structure in which the lamp holder is attached at the predetermined position, protrusions in a length corresponding to the projected second locking unit are provided near the second locking unit which is inserted in the through hole and projected from the opposite side so as to cover the periphery of the second locking unit. Therefore, even when an action such as pushing the second locking unit back is applied to the area near the projected second locking unit, the action can be easily applied to the protrusions when the action is applied to the second locking unit, and the action force is difficult to be applied only to the second locking unit.

That is, for example, when there is a case where the hands of a worker push the area near the second locking unit after the lamp holder is attached in the predetermined position, the hands abut the protrusions along with the second locking unit. Therefore, the situation in which only the second locking unit is pressed and is pushed out from the through hole can be prevented.

As described above, in the lamp holder attachment structure, the protrusions function as latches for the second locking unit. Therefore, the lamp holder does not come off easily after being attached at the predetermined position. Therefore, the lamp holder can be fixed in the predetermined position more surely, and the light source can be disposed in the predetermined position.

The entire disclosures of Japanese Patent Application No. 2006-240411 filed on Sep. 5, 2006 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A lamp holder, comprising:
   a supporting base;
   holding units to hold a light source, which are provided on one surface of the supporting base; and
   locking units to lock the supporting base in a predetermined position, which are provided on the other surface of the supporting base; wherein
   the holding units are provided at at least both ends of the supporting base, and
   the locking units comprise first locking units which extend outside both ends of the supporting base along a longitudinal direction of the supporting base and which are engageably inserted in predetermined openings, and an elastically deformable second locking unit which is a projecting unit shaped in an approximately oval shape projecting in a thickness direction of the supporting base and which is inserted in a predetermined through hole.

2. A lamp holder, comprising:
   a supporting base;
   holding units to hold a light source, which are provided on one surface of the supporting base; and
   locking units to lock the supporting base in a predetermined position, which are provided on the other surface of the supporting base, wherein
   the holding units are provided at at least both ends of the supporting base, and
   the locking units comprise first locking units which extend outside both ends of the supporting base along a longitudinal direction of the supporting base and which are engageably inserted in predetermined openings, and a second locking unit which projects in a thickness direction of the supporting base and which is inserted in a predetermined through hole.

3. The lamp holder as claimed in claim 2, wherein the second locking unit is an elastically deformable projecting unit shaped in an approximately oval shape.

4. A lamp holder attachment structure for attaching the lamp holder claimed in claim 1 to a predetermined position, comprising:
   a frame plate comprising the predetermined openings and the predetermined through hole; and
   a protrusion having a length corresponding to a protruding length of the second locking unit provided in proximity of the second locking unit, the second locking unit being inserted in the through hole and projecting from an opposite side of the frame plate.

5. A lamp holder attachment structure for attaching the lamp holder claimed in claim 2 to the predetermined position, comprising:
   a frame plate comprising the predetermined openings and the predetermined through hole; and
   a protrusion having the length corresponding to a protruding length of the second locking unit provided in proximity of the second locking unit, the second locking unit being inserted in the through hole and projecting from the opposite side of the frame plate.

6. A lamp holder attachment structure for attaching the lamp holder claimed in claim 3 to the predetermined position, comprising:
   a frame plate comprising the predetermined openings and the predetermined through hole; and
   a protrusion having the length corresponding to a protruding length of the second locking unit provide in proximity of the second locking unit, the second locking unit being inserted in the through hole and projecting from the opposite side of the frame plate.

* * * * *